United States Patent
Huang et al.

(10) Patent No.: US 12,466,754 B2
(45) Date of Patent: Nov. 11, 2025

(54) DEVICE AND METHOD FOR LARGE-SCALE FLOW SOLIDIFICATION TREATMENT OF DREDGED SEDIMENT IN PIPELINE WITHOUT YARD

(71) Applicants: Nanjing Hydraulic Research Institute, Nanjing (CN); Nanjing polytechnic Institute, Nanjing (CN); Anhui Jianzhu University, Hefei (CN)

(72) Inventors: Yinghao Huang, Nanjing (CN); Chan Dong, Nanjing (CN); Guojun Cai, Hefei (CN); Shuo Wang, Nanjing (CN)

(73) Assignees: Nanjing Hydraulic Research Institute, Nanjing (CN); Nanjing polytechnic Institute, Nanjing (CN); Anhui Jianzhu University, Hefei (CN)

( * ) Notice: Subject to any disclaimer, the term of this patent is extended or adjusted under 35 U.S.C. 154(b) by 444 days.

(21) Appl. No.: 17/970,815

(22) Filed: Oct. 21, 2022

(65) Prior Publication Data
US 2024/0067552 A1    Feb. 29, 2024

(51) Int. Cl.
  *C02F 11/00*    (2006.01)
  *C02F 11/06*    (2006.01)
  (Continued)

(52) U.S. Cl.
  CPC ............ *C02F 11/008* (2013.01); *C02F 11/06* (2013.01); *E02F 3/90* (2013.01); *E02F 9/20* (2013.01);
  (Continued)

(58) Field of Classification Search
  CPC .... C02F 11/008; C02F 11/06; C02F 2209/01; C02F 2209/03; C02F 2209/40;
  (Continued)

(56) References Cited

U.S. PATENT DOCUMENTS

2018/0354835 A1*    12/2018    Lewis ................... B01F 25/103

FOREIGN PATENT DOCUMENTS

| AU | 2013382749 A1 * | 11/2014 | ............... E02F 3/907 |
| CN | 104099966 A * | 10/2014 | ............... E02F 3/907 |

(Continued)

OTHER PUBLICATIONS

English translation of patent publication CN 10409996A, published Oct. 15, 2014. (Year: 2014).*

(Continued)

*Primary Examiner* — Joseph W Drodge
(74) *Attorney, Agent, or Firm* — Hawaii Patent Services; Nathaniel K. Fedde; Kenton N. Fedde

(57) ABSTRACT

The present invention discloses a device and a method for large-scale flow solidification treatment of dredged sediment in a pipeline without a yard. The device includes a dredger, a treatment unit and a use terminal that are communicated in sequence, where the dredger is connected with the treatment unit by adopting transportation units, a mud pump is arranged between the transportation units and the dredger to provide power, a plurality of transportation units are communicated in sequence by adopting relay pumps, the treatment unit includes a mixing system, a monitoring system and a data processing and control system, and the device is also provided with an air pump. The method for the flow solidification treatment of the sludge in the pipeline, provided in the present invention, fundamentally changes the mode where the traditional dredging engineering needs to set up a large number of sludge yards first, and then uses solidification treatment equipment for stirring and mixing treatment, which saves land, and does not have the problem of environmental pollution of yards, and therefore, the method has wide applicability; and a device and a method for mixing sludge and a solidifying material in a pipeline are (Continued)

provided, the injection speed of a solidifying agent is precisely controlled, the mixing effect is good, the emphasis is on the grading and judging standards of pipelines, and corresponding solutions are given.

6 Claims, 7 Drawing Sheets

(51) Int. Cl.
*C02F 11/14* (2019.01)
*E02F 3/90* (2006.01)
*E02F 9/20* (2006.01)
*E02F 9/26* (2006.01)

(52) U.S. Cl.
CPC ............ *E02F 9/26* (2013.01); *C02F 2209/01* (2013.01); *C02F 2209/03* (2013.01); *C02F 2209/40* (2013.01)

(58) Field of Classification Search
CPC ............ C02F 2209/001; C02F 2103/10; C02F 2103/16; C02F 11/12; C02F 11/14; C02F 11/143; C02F 11/145; C02F 11/147; C02F 11/148; B09C 1/00; F04B 49/00; F04B 49/10; E02F 3/90; E02F 3/907; E02F 9/20; E02F 9/2004; E02F 9/2025; E02F 9/2095; E02F 9/26; B01F 23/232; B01F 23/2323; B01F 23/23231; B01F 23/233; B01F 23/23311; B01F 23/23314
USPC ......... 405/128.1, 128.7, 128.75; 37/309, 413
See application file for complete search history.

(56) References Cited

FOREIGN PATENT DOCUMENTS

| CN | 104294814 A | * | 1/2015 | |
|---|---|---|---|---|
| CN | 108505557 A | * | 9/2018 | .............. E02F 3/885 |
| CN | 109422441 A | * | 3/2019 | |
| CN | 110905521 A | * | 3/2020 | .............. E21D 1/03 |

OTHER PUBLICATIONS

English translation of patent publication CN 104294814A, published Jan. 21, 2015. (Year: 2015).*
English translation of patent publication CN 110905521A, published Mar. 24, 2020. (Year: 2020).*
English translation of patent publication CN 10942241A, published Mar. 5, 2019. (Year: 2019).*
English translation of patent publication CN108505557A, published Sep. 7, 2018. (Year: 2018).*

* cited by examiner

DEVICE AND METHOD FOR LARGE-SCALE FLOW SOLIDIFICATION TREATMENT OF DREDGED SEDIMENT IN PIPELINE WITHOUT YARD

TECHNICAL FIELD

The present invention relates to the technical field of environmental governance and solid waste treatment, in particular to a device and a method for large-scale flow solidification treatment of dredged sediment in a pipeline without a yard.

BACKGROUND

Dredged sediment, due to its special formation method, has finer particles, large porosity, high liquid limit, and extremely poor engineering properties, which cannot be used directly for engineering, and some even contain pollutants such as heavy metals and organic matters. Sludge is produced from a wide range of sources, among which dredging is the most method to produce the sludge, and its volume is huge. The traditional large-scale treatment method is mainly solidification treatment, that is, adding a solidifying agent (such as cement and gypsum) to the sludge that meets certain conditions (pollutants, moisture content, etc.) to rapidly improve its engineering mechanical strength in a short period of time, and to achieve the required bearing performance after solidifying for a certain period of time. At present, the main solidification treatment method in China is a pretreatment in a yard, followed by ex-situ solidifying or in-situ solidifying in the yard, which often needs to occupy the yard for a long time, consumes a lot of time and space cost, and has poor economy Aiming at the problem, the prior art provides a means of solidifying the sludge in a pipeline. For example, in the technical solutions of Application No. 201810020729.3 and Application No. 201010153656.9, an in-pipeline processing method is provided. However, all of objects (sludge) to be treated need to be pre-adjusted to a lower moisture content, and the transmission distance is limited, and all the objects require a pretreatment in a yard. In addition, the regulation and control of the sludge state in the two prior art patents only consider the moisture content of the sludge, does not take into account the properties of the sludge itself. For example, for sandy soil and clay, when the moisture content is the same, the flow state is very different, so it is difficult to adapt to the treatment of materials of different materials.

Industrial waste residues include but not limited to industrial waste residues produced in the production of chemical industry, mining industry, thermal power generation and other industries, such as tailings mud, alkali residue, coal gangue, steel slag, and blast furnace slag, and have a large output, and the traditional treatment methods (landfill, stacking, dumping, etc.) seriously pollute the environment and cause unnecessary waste.

In view of the above-mentioned problems, how to provide an efficient treatment device and method that does not require a yard is an urgent problem to be solved by those skilled in the art.

SUMMARY

In view of this, the present invention provides a flow solidification technology capable of treating sludge, construction mud and yard mud on a large scale in a pipeline without pre-treatment in a yard. In the method, a certain proportion of mixing functional preparation is sprayed into a conveying pipeline, and the flowing slurry and the preparation are fully mixed within a certain distance by means of a certain pipeline shape or mechanical stirring and other modes, and then the mixture is directly poured in a designated area. The method does not require the use of a yard, and can transport flow solidification sludge over a long distance, which greatly reduces the cost of space and time, has extremely high economic value, and can greatly reduce the environmental pollution of the dredged sediment yard.

To achieve the above-mentioned object, the present invention adopts the following technical solution:

A device for large-scale flow solidification treatment of dredged sediment in a pipeline without a yard includes a dredger, a treatment unit and a use terminal that are communicated in sequence by adopting transportation units, wherein the dredger is connected with the treatment unit by the transportation units, a mud pump is arranged between the transportation units and the dredger to provide power, the transportation units include transportation pipelines, a plurality of transportation units are provided, and are communicated in sequence by adopting relay pumps, the treatment unit includes a mixing system, a monitoring system and a data processing and control system, and the device is also provided with an air pump;

the mixing system includes a mixing device, the mixing device is provided with a plurality of admixture pump inlets, and the admixture pump inlets are communicated with an admixture injection pump;

the monitoring system includes density sensors, flow sensors and pressure sensors that are arranged on the transportation pipelines; and the data processing and control system includes a data acquisition and calculation module and a control module, wherein the density sensors, the flow sensors and the pressure sensors are all connected to the data acquisition and calculation module, and the mud pump, the admixture injection pump, the air pump and the relay pumps are all connected to the control module.

Preferably, a sludge mixing system is arranged between the dredger and the treatment unit, and the sludge mixing system includes a feeding device, a water adding device and a mechanical stirring device that are connected to the control module, the dredger is connected with the sludge mixing system by adopting pipelines, and the pipelines are provided with density sensors connected to the data acquisition and calculation module.

Preferably, the mixing device is one or a combination of more of a serpentine tube, a gas-phase serpentine tube, a multi-stage series W-shaped tube, a gas-phase multi-stage series W-shaped tube, a cylindrical vertical stirring, mixing and homogenizing device, a gas-phase cylindrical vertical stirring, mixing and homogenizing device, a hydraulic self-rotating homogenizing and mixing device, a gas-phase hydraulic self-rotating homogenizing and mixing device, a gas-phase mixing and homogenizing tube, and a pneumatic mixing-assisted expansion tube.

Furthermore, the gas-phase serpentine tube, the gas-phase multi-stage series W-shaped tube and the gas-phase mixing and homogenizing tube are all provided with an air inlet, the air inlets are connected to an air pump, and the air pump is connected to the control module.

Furthermore, the cylindrical vertical stirring, mixing and homogenizing device includes a motor, a stirring barrel and a stirring blade that is arranged in the stirring barrel and is connected to an output shaft of the motor, and the admixture pump inlet is arranged on the stirring barrel; and the gas-phase cylindrical vertical stirring, mixing and homogenizing device is provided with an air inlet on the basis of the cylindrical vertical stirring, mixing and homogenizing device, the air inlet is arranged on the stirring barrel, and the air inlet is connected to the air pump.

Furthermore, the hydraulic self-rotating homogenizing and mixing device includes a mixing pipe and a shaft arranged at the center of the mixing pipe, blades are rotationally arranged on the surface of the shaft, and the admixture pump inlet is arranged on the mixing pipe; and the gas-phase hydraulic self-rotating homogenizing and mixing device is provided with an air inlet on the basis of the hydraulic self-rotating homogenizing and mixing device, the air inlet is arranged on the mixing pipe, and the air inlet is connected to the air pump.

Furthermore, the pneumatic mixing-assisted expansion tube includes a pre-conveying area, an expansion area and a post-conveying area that are arranged in sequence, the admixture pump inlet is arranged on the expansion area, the pre-conveying area and the post-conveying area are provided with air inlets, the admixture injection pump is communicated with the admixture pump inlet, and the air inlets are connected to the air pump.

In the above-mentioned technical solution, the cross-sectional area of the air inlet of each mixing device is $\frac{1}{10}$ to $\frac{1}{6}$ of the cross-sectional area of a mixing device to which the air inlet of the mixing device is connected, and the included angle between the air inlet and the mixing device is 5 degrees to 9 degrees; and the cross-sectional area of the additive pump inlet is $\frac{1}{10}$ to $\frac{1}{4}$ of the cross-sectional area of a mixing device to which the additive pump inlet is connected, and the included angle between the additive pump inlet and the mixing device is 15 degrees to 90 degrees.

The present invention further provides a method for large-scale flow solidification treatment of dredged sediment in a pipeline without a yard by adopting the device provided according to of the above-mentioned technical solution, including the following steps:

Step 1: excavating sludge by using a dredger, and judging whether the sludge needs to be mixed or not according to the moisture content and liquid limit of the sludge, enabling the unqualified sludge to enter a sludge mixing system, enabling the qualified sludge or the mixed qualified sludge to enter a treatment unit through transportation pipelines, and acquiring information of a monitoring system and performing calculation according to the requirements of a use terminal, and then transmitting the information to a control module by a data acquisition and calculation module;

Step 2: controlling a mud pump and an admixture injection pump, and controlling the inlet flow according to the data of the data acquisition and calculation module by the control module, adding an admixture, and precisely controlling the addition amount; and Step 3: acquiring information of the monitoring system to judge the blockage and the degree of blockage of the system, and feeding back to the control module to adjust the mud pump, an air pump and a relay pump to clear the blockage by the data acquisition and calculation module.

Preferably, in the Step 1, the qualified standard of moisture content is greater than 1.5 times the liquid limit and less than 4 times the liquid limit, when the moisture content is greater than 4 times the liquid limit, the industrial waste residues are added through a feeding device for mixing, and when the moisture content is less than 1.5 times the liquid limit, water is added through a water adding device for mixing.

The admixture is one or more of a solidifying agent, a retarder, a water reducing agent, a pumping agent, and an accelerator, where the solidifying agent is cement, lime, fly ash, gypsum, alkali residue, granulate blast furnace residue and other industrial waste residues to improve the utilization rate of waste, and the source of raw materials is easily available and the cost is low.

The addition of the retarder and the accelerator is generally selected according to engineering needs. When the transmission distance is long (over 4 km) or the initial moisture content of the sludge is low, the retarder can be used to improve the flow performance of the sludge. When the strength needs to be obtained quickly in a short period of time after pouring, the accelerator is added during the pouring of the flow solidification sludge.

Moreover, according to the structure of the present invention, the admixture is added by multi-point injection.

Preferably, the judgment of the degree of blockage of the Step 3 and the corresponding solution are as follows:

the data acquisition and calculation module calculates the real-time density, flow rate, pressure, velocity and viscosity of a material in the pipeline with the acquired data information, judges the blockage via the velocity and/or pressure in the pipeline, and feeds back to the control module, the relay pump is started or the power of the relay pump and the mud pump is increased, and the air pump is started, and if the blockage is not improved, the operation is stopped to manually clear the blockage.

As can be seen from the above-mentioned technical solution, compared with the prior art, the present invention provides a device and a method for large-scale flow solidification treatment of dredged sediment in a pipeline without a yard, which have the following beneficial effects:

The present invention provides a flow solidification technology capable of treating sludge on a large scale in a pipeline without pre-treatment in a yard. In the method, a certain proportion of solidifying agent, retarder, accelerator and the like are sprayed into a sludge conveying pipeline, and the slurry and the solidifying agent are fully mixed within a certain distance by means of a certain pipeline shape or mechanical stirring and other modes, and then the mixture is directly poured in a designated area. The method does not require the use of a yard, and can transport flow solidification sludge over a long distance, which greatly reduces the cost of space and time, has extremely high economic value, and can greatly reduce the environmental pollution of the dredged sediment yard. According to the present invention, the moisture content of the dredged sediment which does not conform to the pipeline flowing solidification sludge construction process can be adjusted, the adjustment process is carried out in real time, without the need for yards and other sites, and the adjusted sludge can be directly subjected to the subsequent pipeline flow solidification process. The method for the flow solidification treatment of the sludge in the pipeline, provided in the present invention, fundamentally changes the mode where the traditional dredging engineering needs to set up a large number of sludge yards first, and then uses solidification treatment equipment for stirring and mixing treatment, which saves land, and does not have the problem of environmental pollution of yards, and therefore, the method has wide applicability; and a device and a method for mixing sludge and a solidifying material in a pipeline are creatively provided, the injection speed of a solidifying agent is precisely controlled, the mixing effect is good, the emphasis is on the grading and judging standards of pipelines, and corresponding solutions are given. The energy loss and time cost are reduced, and the environmental pollution problem of the yard is solved at the same time. The method for mixing the sludge and the solidifying agent in the pipeline has a clear idea and wide applicability. The sludge and the solidifying agent are uniformly mixed by using a turbulent flow effect. It is important that the technical solution of the present invention considers liquid limit of the slurry, is not only suitable for the treatment of sludge dredging, but also can be used for transportation and treatment of construction slurry, etc., and has a wide range of application.

BRIEF DESCRIPTION OF THE DRAWINGS

In order to more clearly explain the embodiments of the present invention or the technical solution in the prior art, the drawings required for use in the description of the embodiments or prior art will be briefly described below, and it will be apparent that the drawings in the following description are only some embodiments of the present invention from which other drawings can be obtained without creative effort by those of ordinary skill in the art.

DETAILED DESCRIPTION

Hereinafter, the technical solution of the present invention will be clearly and completely described in combination with the embodiments of the present invention. Obviously, the described embodiments are only a part of the embodiments of the present invention, rather than all the embodiments. Based on the embodiments of the present invention, all other embodiments obtained by those of ordinary skill in the art without creative effort shall fall within the protection scope of the present invention.

Figure 1:
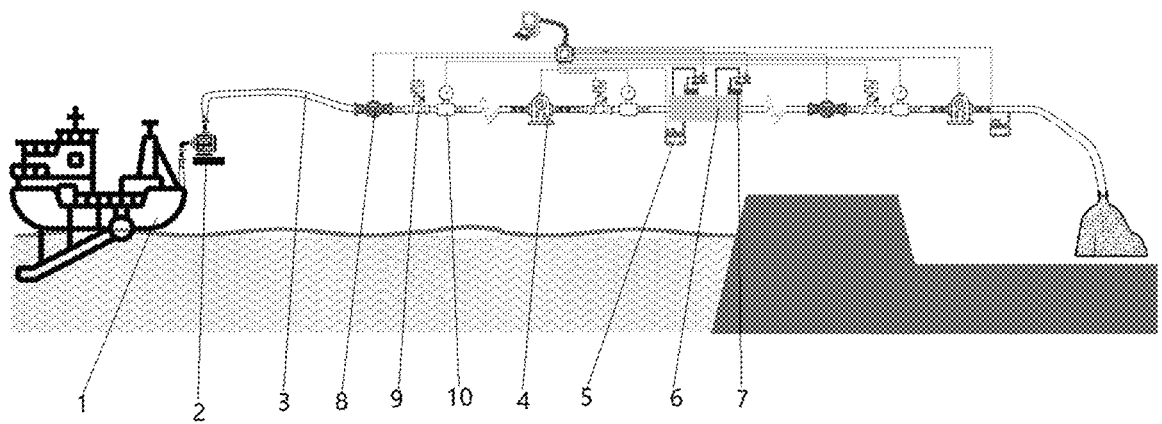
FIG. 1 is an overall structural diagram of the present invention.

As shown in FIG. 1, a device for large-scale flow solidification treatment of dredged sediment in a pipeline without a yard includes a dredger 1, a treatment unit and a use terminal that are communicated in sequence by adopting transportation units, where the dredger 1 is connected with the treatment unit by adopting the transportation units, a mud pump 2 is arranged between the transportation units and the dredger 1 to provide power, the transportation units include transportation pipelines 3, a plurality of transportation units are provided, and are communicated in sequence by adopting relay pumps 4, the treatment unit comprises a mixing system, a monitoring system and a data processing and control system, and the device is also provided with an air pump 5;

the mixing system comprises a mixing device 6, the mixing device 6 is provided with a plurality of admixture pump inlets 61, and the admixture pump inlets 61 are communicated with an admixture injection pump 7;

the monitoring system comprises density sensors 8, flow sensors 9 and pressure sensors 10 that are arranged on the transportation pipelines; and the data processing and control system comprises a data acquisition and calculation module and a control module, where the density sensors 8, the flow sensors 9 and the pressure sensors 10 are all connected to the data acquisition and calculation module, and the mud pump 2, the additive injection pump 7, the air pump 5 and the relay pumps 4 are all connected to the control module.

In the above-mentioned technical solutions, for the density sensor, the pipeline liquid density sensors that can be used mainly include capacitive type, ultrasonic type, tuning fork type, resonance type, ray type and vibrating tube type liquid density sensors, with an accuracy of ±1 kg/m3. For the pressure sensor and the flow sensor, the sensors commonly used in the market are used, with an accuracy of ±1 Pa and ±1 m 3/s.

Figure 2:
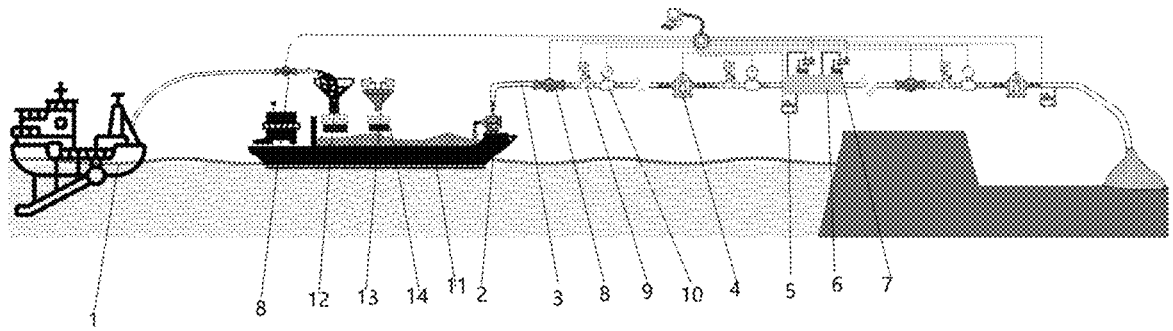
FIG. 2 is an overall structural diagram of the present invention.
Figure 3:
FIG. 3 is a structural diagram of a serpentine tube of the present invention.
Figure 4:
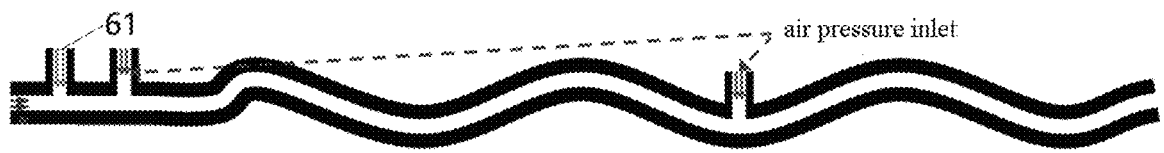
FIG. 4 is a structural diagram of a gas-phase serpentine tube of the present invention.
Figure 5:
FIG. 5 is a structural diagram of a multi-stage series W-shaped tube of the present invention.
Figure 6:
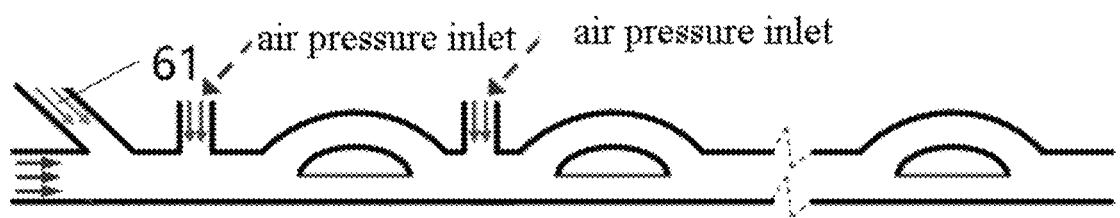
FIG. 6 is a structural diagram of a gas-phase multi-stage series W-shaped tube of the present invention.
Figure 7:
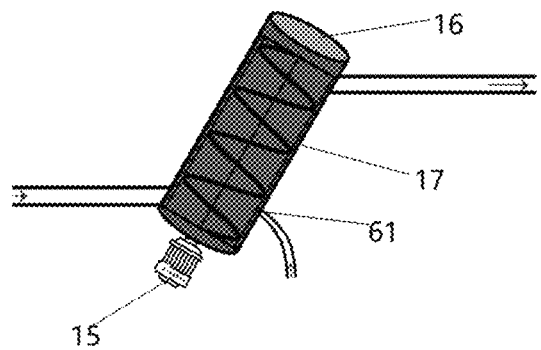
FIG. 7 is a structural diagram of a cylindrical vertical stirring, mixing and homogenizing device of the present invention.
Figure 8:
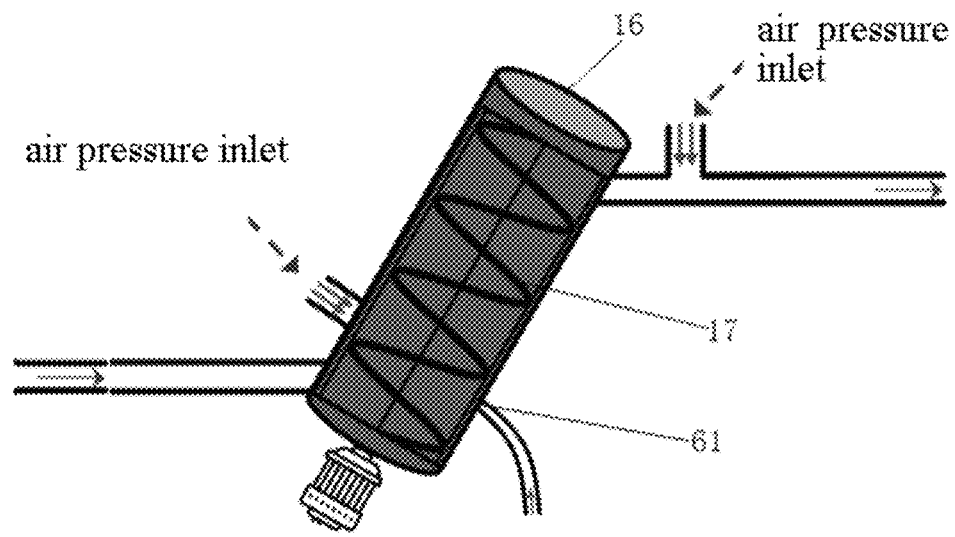
FIG. 8 is a structural diagram of a gas-phase cylindrical vertical stirring, mixing and homogenizing device of the present invention.
Figure 9:
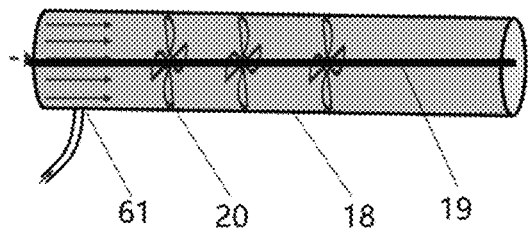
FIG. 9 is a structural diagram of a hydraulic self-rotating homogenizing and mixing device of the present invention.
Figure 10:
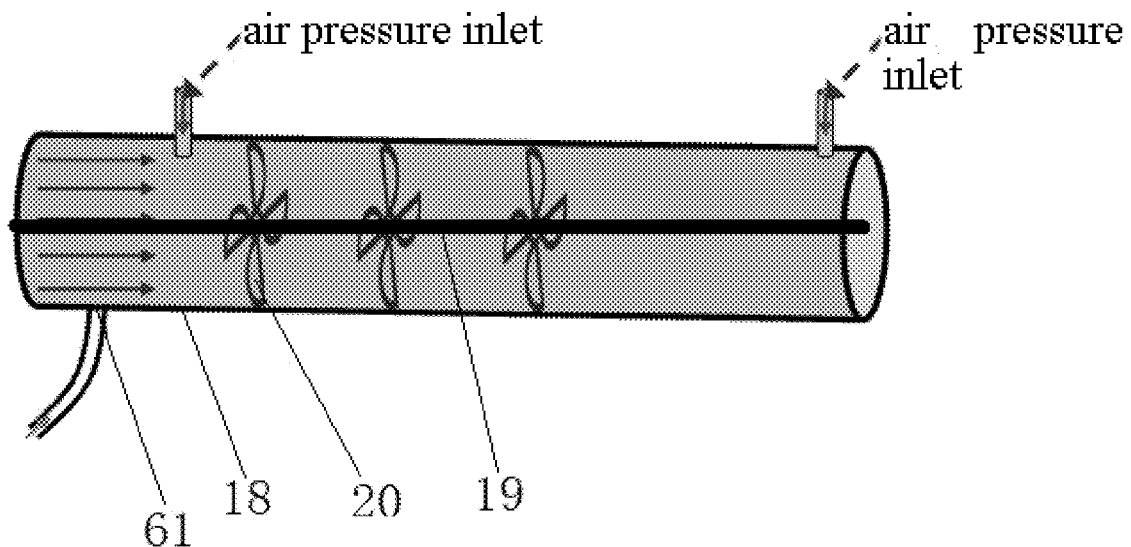
FIG. 10 is a structural diagram of a gas-phase hydraulic self-rotating homogenizing and mixing device of the present invention.
Figure 11:
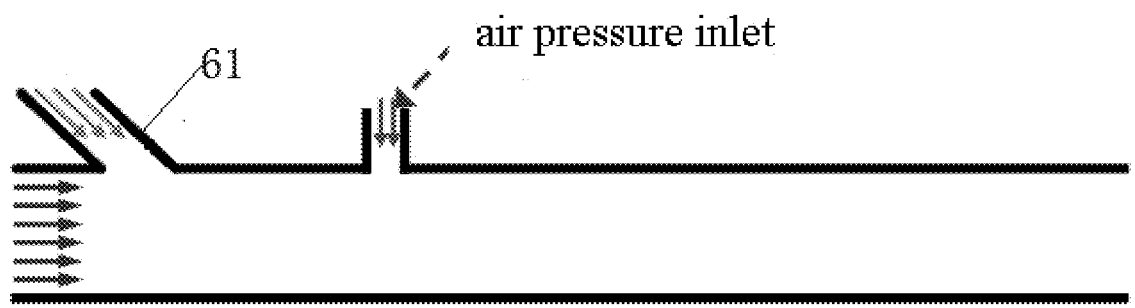
FIG. 11 is a structural diagram of a gas-phase mixing and homogenizing tube of the present invention.
Figure 12:
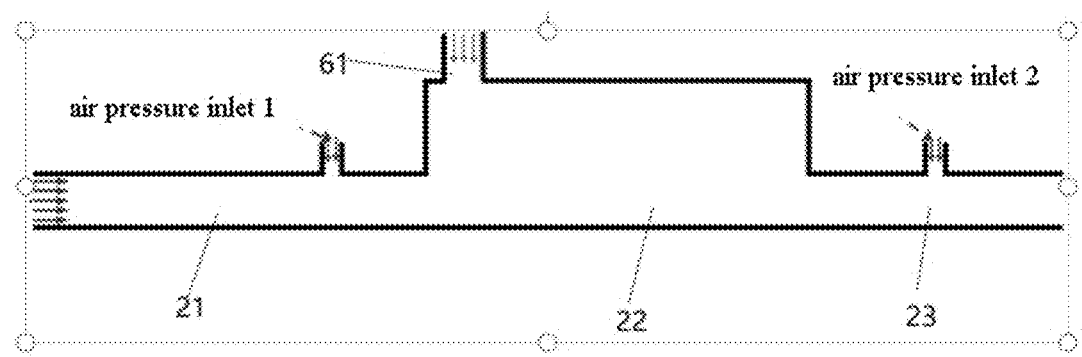
FIG. 12 is a structural diagram of a pneumatic mixing-assisted expansion tube of the present invention.

As shown in FIG. 2, in some specific technical solutions, a sludge mixing system 11 is arranged between the dredger 1 and the treatment unit, and the sludge mixing system 11 includes a feeding device 12, a water adding device 13 and a mechanical stirring device 14 that are connected to the control module, the dredger 1 is connected with the sludge mixing system 11 by adopting pipelines, and the pipelines are provided with a density sensor 8 connected to the data acquisition and calculation module.

As shown in FIGS. 3-12, in some specific technical solutions, the mixing device is one or a combination of more of a serpentine tube, a gas-phase serpentine tube, a multi-stage series W-shaped tube, a gas-phase multi-stage series W-shaped tube, a cylindrical vertical stirring, mixing and homogenizing device, a gas-phase cylindrical vertical stirring, mixing and homogenizing device, a hydraulic self-rotating homogenizing and mixing device, a gas-phase hydraulic self-rotating homogenizing and mixing device, a gas-phase mixing and homogenizing tube, and a pneumatic mixing-assisted expansion tube.

The serpentine tube is mainly a continuous bent pipe with a large degree of tortuosity. During the flow of slurry in the serpentine tube, the turbulent flow occurs due to the inconsistency between the flow direction and the pipeline, and the strong mixing effect of turbulent flow is the main principle for mixing of sludge and additives uniformly. Preliminary tests show that the sludge and the additives are fully mixed uniformly by means of the serpentine tube mixing process when the transportation distance is 200 m to 300 m; and air pressure in the gas-phase mixing and homogenizing tube pushes the sludge and the additives to be transported together in the pipeline, and the additives and the sludge are fully mixed during the transportation process. Tests prove that the sludge and the additives can achieve a good mixing effect when the air pressure is 400 kPa to 800 kPa and the transportation distance is 150 m to 200 m by means of the method;

The multi-stage series W-shaped tube consists of two pipes, one of which is longer and the other is extended according to the original route, so that the slurry flow can be divided into two parts. The velocity in the longer pipe is lower, and the velocity in the shorter pipe is higher, and the turbulence intensity will be further strengthened when the two fluids, one high and one low in velocity, meet, thereby promoting the mixing of the sludge and the additives; and The cylindrical vertical stirring, mixing and homogenizing device includes a motor 15, a stirring barrel 16, and a stirring blade 17 that is arranged in the stirring barrel 16 and is connected to the output shaft of the motor 15, where the admixture pump inlet is arranged on the stirring barrel 16; and the gas-phase cylindrical vertical stirring, mixing and homogenizing device is provided with an air inlet on the basis of the cylindrical vertical stirring, mixing and homogenizing device, the air inlet is arranged on the mixing barrel 16, and the air inlet is connected to the air pump; and it should be noted that the stirring blade 17 in the middle can conduct segmented stirring, and if the cylinder is vertical or inclined, the height should not be too high, otherwise the loss of power for the mud pump to overcome the gravity of the slurry is caused.

The hydraulic self-rotating homogenizing and mixing device includes a mixing pipe 18 and a shaft 19 arranged at the center of the mixing pipe 18, where blades 20 are rotationally arranged on the surface of the shaft 19, and the admixture pump inlet is arranged on the mixing pipe 18; the gas-phase hydraulic self-rotating homogenizing and mixing device is provided with an air inlet on the basis of the hydraulic self-rotating homogenizing and mixing device, the air inlet is arranged on the mixing pipe, and the air inlet is connected to the air pump; and when the slurry flows, the slurry drives the blades 20 to rotate, and the slurry is also affected by the rotation of the blades 20 to generate a stronger turbulent flow intensity, which further promotes the uniformly mixing of the sludge and the additives; and The pneumatic mixing-assisted expansion tube includes a pre-conveying area 21, an expansion area 22, and a post-conveying area 23 that are arranged in sequence, where the admixture pump inlet is arranged on the expansion area 22, the pre-conveying area 21 and the post-conveying area 23 are provided with air inlets, the admixture injection pump is communicated with the admixture pump inlet, and the air inlet is connected to the air pump, a section of suddenly increased area is arranged in the middle of the pipeline, air pressure is pumped before the expansion tube, the solidifying agent is sprayed into the expansion tube, and after spraying in the expansion tube is completed, an air pressure inlet can be arranged as required.

The cross-sectional area of the air inlet of each mixing device is 1/10 to 1/6 of the cross-sectional area of a mixing device to which the air inlet of the mixing device is connected, and the included angle between the air inlet and the mixing device is 5 degrees to 9 degrees; and the cross-sectional area of the admixture pump inlet is 1/10 to 1/4 of the cross-sectional area of a mixing device to which the admixture pump inlet is connected, and the included angle between the admixture pump inlet and the mixing device is 15 degrees to 90 degrees.

The principle and specific method of carrying out the long-distance integrated desilting and dredging without a yard by the device according to the technical solution are as follows:

Step 1: excavating sludge by using a dredger, and judging whether the sludge needs to be mixed or not according to the moisture content and liquid limit of the sludge, enabling the unqualified sludge to enter a sludge mixing system, enabling the qualified sludge or the mixed qualified sludge to enter a treatment unit through transportation pipelines, and acquiring information of a monitoring system and performing calculation according to the requirements of a use terminal, and then transmitting the information to a control module by a data acquisition and calculation module;

where the qualified standard of moisture content is greater than 1.5 times the liquid limit and less than 4 times the liquid limit, when the moisture content is greater than 4 times the liquid limit, the industrial waste residues are added through a feeding device for mixing, and when the moisture content is less than 1.5 times the liquid limit, water is added through a water adding device for mixing; the liquid limit refers to the liquid limit of dredged sediment, and its indicators are tested in accordance with the relevant regulations of "Standard for Geotechnical Testing Method GB/T 50123-2019". In addition, it is necessary to measure the specific gravity Gs of the dredged sediment (for the sludge in a certain area, the specific gravity changes are small and can be considered as a constant). The density of the newly dredged mud obtained by the density sensor is ρ0 (kg/m3), and assuming that the target moisture content is w and the water density is ρ water (kg/m3), then:

When water needs to be added, for every 1 m³ of dredged sediment, it is necessary to add water $$\Delta m_{水} \text{ for } G_s \frac{\rho_0 - \rho_{水}}{G_s - \rho_{水}} \cdot (w+1) - \rho_0 \text{ (kg)};$$

and

When feeding is required, it is assumed that the moisture content of the added feed is wa, the density is ρa, and then, for every 1 m³ of dredged sediment, it is necessary to add material for $$m_a = \left( \frac{\rho_0 - G_s \dfrac{\rho_0 - \rho_{水}}{G_s - \rho_{水}}}{w} - G_s \frac{\rho_0 - \rho_{水}}{G_s - \rho_{水}} \right) \text{(kg)}.$$

Step 2: controlling a mud pump and an admixture injection pump, and controlling the inlet flow according to the data of the data acquisition and calculation module by the control module, adding an admixture, and precisely controlling the addition amount; and The admixture is one or more of a solidifying agent, a retarder, a water reducing agent, a pumping agent, and an accelerator.

The above-mentioned calculations are as follows in detail:

The addition amount of admixtures added needs to be combined with indoor fluidity test, rheological test and indoor UCS (Unconfined Compressive Strength test) or triaxial compression test. The indoor fluidity test needs to meet the requirements that the fluidity is greater than 160 mm, and the UCS or triaxial compression test needs to meet the design mechanical strength index. According to the designed optimal admixture dosage obtained from the indoor test, the admixture is mixed into a liquid state, and the amount of the admixture is controlled in real time by the monitoring system.

Figure 14:
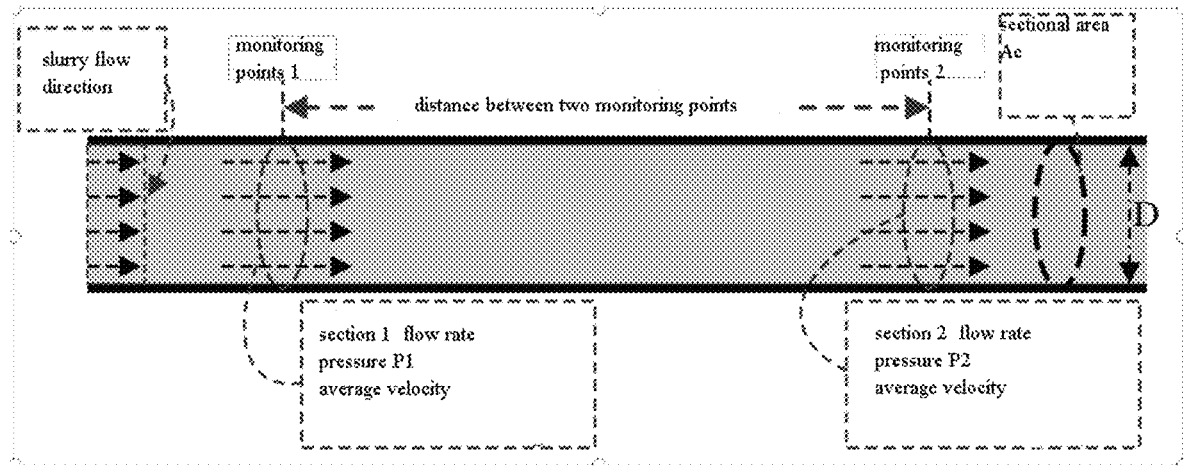
FIG. 14 is a control schematic diagram of the additive amount of admixtures of the present invention.

According to the indoor test, the dosage of certain additives (a solidifying agent, an accelerator, a retarder, etc.) is determined as qadditive (kg/m3), as shown in FIG. 14, pressure sensors and flow sensors are installed at a pipeline monitoring point 1 and a pipeline monitoring point 2, and the cross-sectional area of the pipeline is Ac (m2), the flow rate of a pipeline section 1 is Q1, the pressure is p1, and the average velocity is Vavg1, while the flow rate of a pipeline section 2 is Q2, the pressure is p2, and the average velocity is Vavg2. For a certain additive (a solidifying agent, an accelerator, a retarder, etc.), the known dosage is qadditive, the density is ρcement, and then: for the monitoring point 1, the mass rate of the mixed solidifying agent is qadditive·Q1 (kg/s), and the volume rate is qadditive·Q1/pcement (m3/s).

Figure 17:
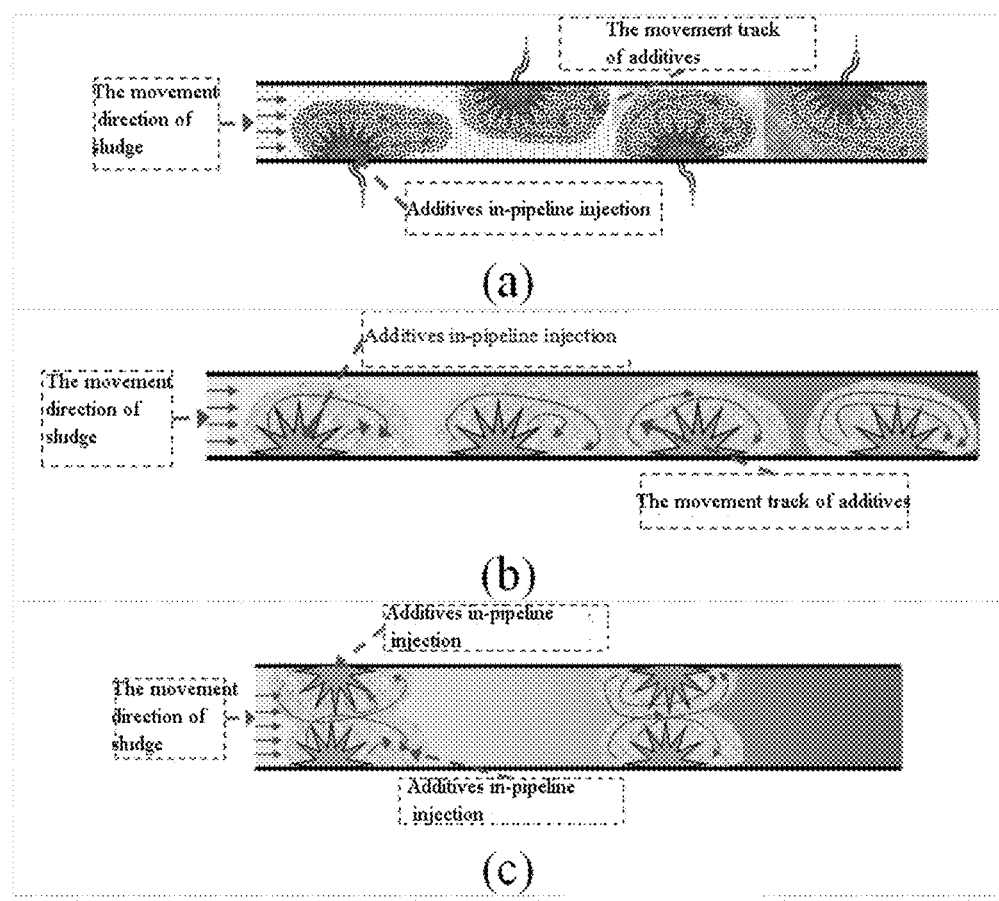
FIG. 17 is a layout diagram of multi-point injection ports of the present invention.

The above-mentioned additions all adopt multi-point injection type addition, and 3 to 8 injection ports can be provided. The arrangement of the injection ports is as shown in FIG. 17, the injection ports can be arranged in a staggered and side-by-side manner. The spacing between adjacent injection ports in a staggered arrangement (a) is preferably 3 to 6 times the diameter of the pipelines, the spacing between adjacent injection ports in a side-by-side arrangement (b) is preferably 2 to 4 times the diameter of the pipelines, or the injection ports can be in a same-section arrangement (c), and the spacing between the front and rear sections in the flow direction is preferably 2 to 4 times the diameter of the pipelines.

Figure 13:
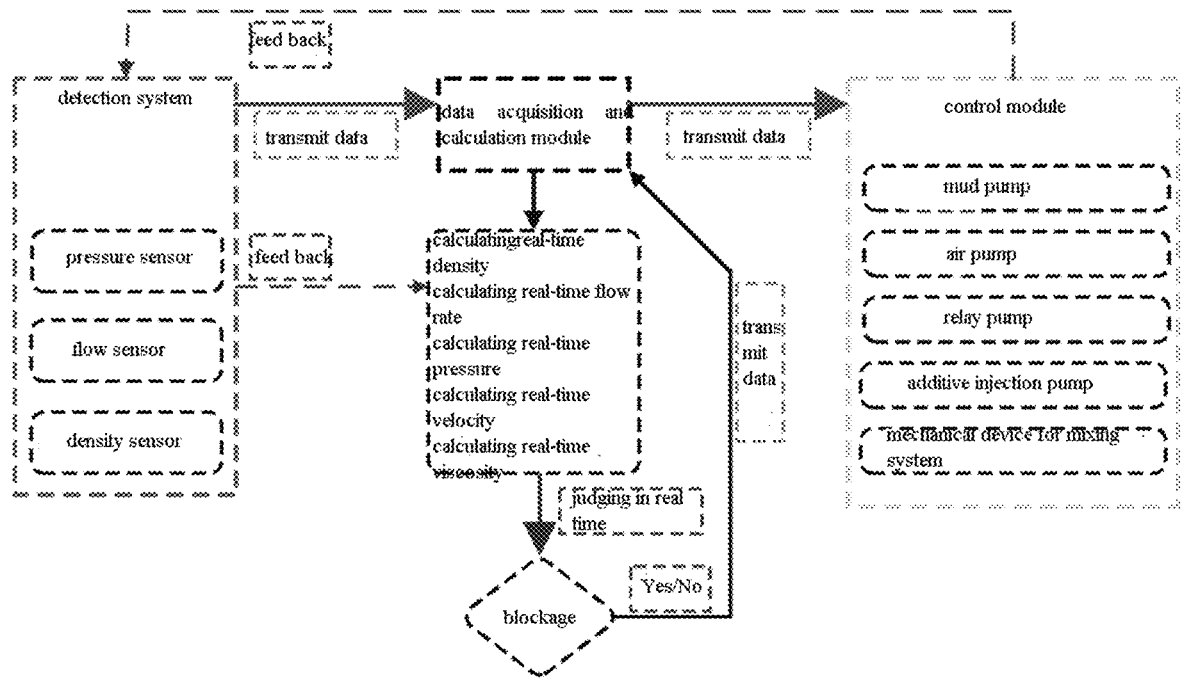
FIG. 13 is a data transmission and control diagram of the present invention.

Step 3: acquiring information of the monitoring system to judge the blockage and the degree of blockage of the system, and feeding back to the control module to adjust the mud pump, an air pump and a relay pump to clear the blockage by the data acquisition and calculation module;

As shown in FIG. 13, the judgment of the degree of blockage of the Step 3 and the corresponding solution are as follows:

the data acquisition and calculation module calculates the real-time density, flow rate, pressure, velocity and viscosity of a material in the pipeline with the acquired data information, judges the blockage via the velocity and/or pressure in the pipeline, and feeds back to the control module, the relay pump is started or the power of the relay pump and the mud pump is increased, and the air pump is started, and if the blockage is not improved, the operation is stopped to manually clear the blockage;

According to the relevant theory of fluid dynamics (a Navi-Stokes equation and a Bernoulli principle), due to the influence of gravity, viscosity, pipeline wall friction, etc. in the slurry flow in the pipeline, the fluid pressure along the flow direction will decrease. When the pressure drops to a certain value, blockage occurs. The pressure drop has a certain relationship with the velocity and the geometric characteristics, etc of the pipeline. The relationship among pressure drop, velocity, flow rate and viscosity can be obtained through theoretical research as shown in formulas 1-4:

pressure drop calculation Δp (Pa) $\Delta p = p_2 - p_1$ Formula 1;

the average velocity of the cross-section $$V_{avg}(m/s)^{V_{avg} = \frac{\Delta p D^2}{32 \mu L}};$$ Formula 2 volume flow $$Q\ (m3/s)^{Q = V_{avg} A_c = \frac{\Delta p \pi D^4}{128 \mu L}};$$ Formula 3 dynamic viscosity μ

$$(Pa \cdot s)^{\mu = \frac{\Delta p \pi D^4}{128 Q L}};$$ Formula 4 where,

Since the average velocity of the section can be calculated in real time through the combination of pressure drop and volume flow, a blockage judgment program can be set up, that is, if the average velocity $V_{avg}$ of the section is <0.1 m/s, or $\Delta p/p_1 > 0.8$ (one of the two conditions is satisfied), it is judged that the flow solidification sludge in the pipeline is blocked; and The pressure, flow rate, and mixing uniformity in flow solidification pipelines are monitored in real time so as to judge the transportation status of the flow solidification sludge in the pipeline. In a transportation pipeline with a diameter of D, a length of L, and a cross-sectional area of Ac: the pressure sensor monitors the slurry pressure in the pipeline in real time, and the pressure drop in the pipeline is determined by a plurality of pressure sensors (Equation 1); and the flow sensor monitors the change of the cross-sectional volume flow rate in the pipeline in real time, and thus calculates the average velocity at the interface (combination of Equation 1, Equation 2, Equation 3, and Equation 4).

Figure 15:
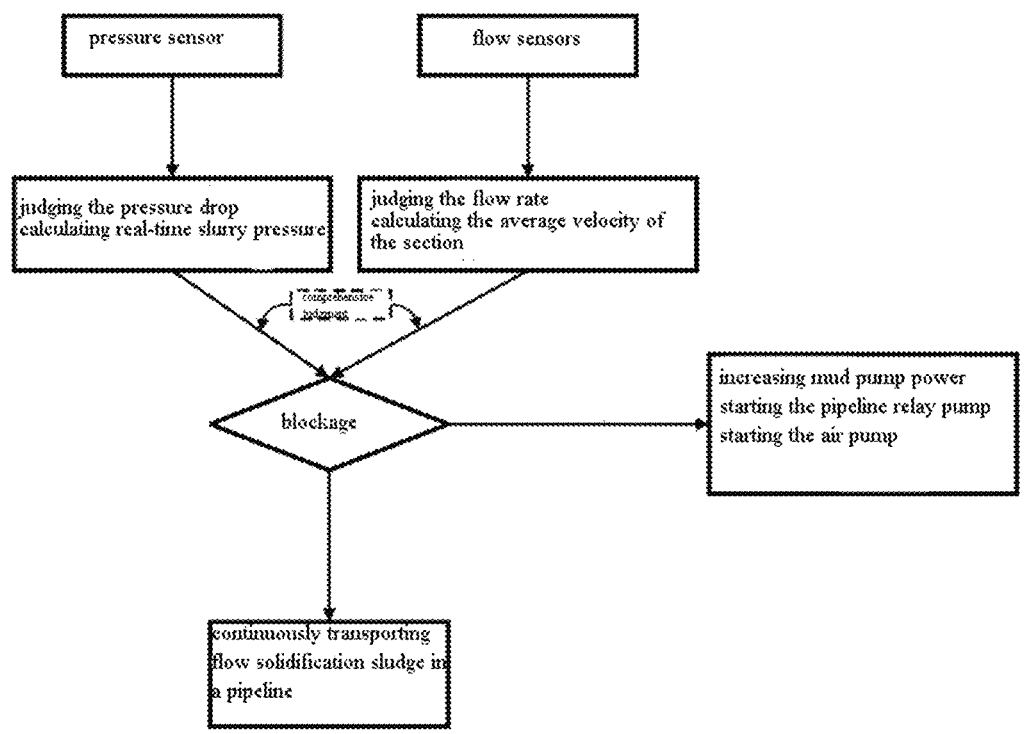
FIG. 15 is a flow chart of a blockage detection system of the present invention.
Figure 16:
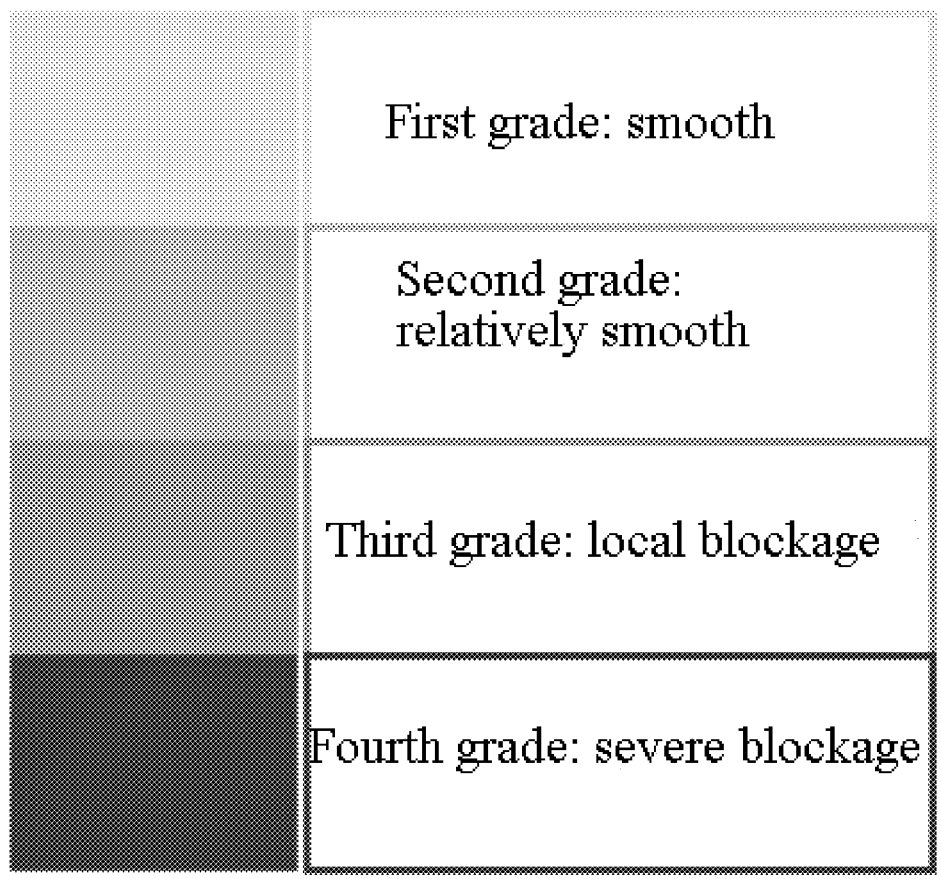
FIG. 16 is the severity of blockage and corresponding color of the present invention.

The working logic is shown in FIG. 13 and FIG. 15, the indicators such as pressure, velocity, and flow rate in the pipeline are in a state of constant change. Therefore, it is necessary to accurately control the addition amount and addition rate of each additive (a solidifying agent, an accelerator and a retarder) according to the real-time motion state indicators (pressure, velocity and flow rate);

Judgment and treatment measures for blockage: blockage is divided into four grades, as shown in FIG. 16; at the first grade, no blockage occurs in the pipeline; at the second grade, when the velocity or pressure drop in the pipeline reaches a certain level, the relay pump is started or the power of the mud pump is increased, so that the mud velocity/ pressure drop/flow rate in the pipeline is kept at the first grade; at the third grade, local blockage occurs in the pipeline (generally occurs at the end of the pipeline), at this time, the relay pump is started or the power of the relay pump is increased, if the blockage is still serious, the air pump is started, so that the mud velocity/pressure drop/flow rate in the pipeline is kept at the first/second grade; and at the fourth grade, the blockage occurs in the area above ¼ of the pipeline, and when all mud pumps, relay pumps and air pumps have reached the maximum power, manual investigation should be carried out and the blockage should be cleaned manually.

The various embodiments in the present specification are described in a progressive manner, and each embodiment focuses on the differences from other embodiments, and the same and similar parts between the various embodiments can be referred to each other. As for the device disclosed in the embodiments, since it corresponds to the method disclosed in the embodiments, the description is relatively simple, and the relevant part can be referred to the description of the method.

The above-mentioned description of the disclosed embodiments enables those skilled in the art to make or use the present invention. Various modifications to these embodiments will be readily apparent to those skilled in the art, and the generic principles defined herein may be implemented in other embodiments without departing from the spirit or scope of the present invention. Therefore, the present invention is not intended to be limited to the embodiments shown herein, but is to be accorded the widest scope consistent with the principles and novel features disclosed herein.

The invention claimed is:

1. A device for flow solidification treatment of dredged sediment in a pipeline, comprising:
    a dredger, a treatment unit and a user terminal, the dredger and the treatment unit being communicated by a sequence of transportation units,
    wherein the dredger is connected with the treatment unit by the transportation units, a mud pump is arranged between the transportation units and the dredger to provide power, the transportation units comprise transportation pipelines and are communicated in sequence by relay pumps, the treatment unit comprises a mixing system, a monitoring system and a data processing and control system, and the device is also provided with an air pump;
    wherein the mixing system comprises a mixing device, the mixing device is provided with a plurality of admixture pump inlets, and the admixture pump inlets are communicated with an admixture injection pump;
    wherein the monitoring system comprises density sensors, flow sensors and pressure sensors that are arranged on the transportation pipelines; and
    wherein the data processing and control system comprises a data acquisition and calculation module and a control module being communicated with the user terminal, wherein the density sensors, the flow sensors and the pressure sensors are all connected to the data acquisition and calculation module, and the mud pump, the admixture injection pump, the air pump and the relay pumps are all connected to the control module.

2. The device for flow solidification treatment of dredged sediment in a pipeline according to claim 1, wherein a sludge mixing system is arranged between the dredger and the treatment unit, and the sludge mixing system comprises a feeding device, a water adding device and a mechanical stirring device that are connected to the control module, and the dredger is connected with the sludge mixing system by the transportation pipelines.

3. The device for flow solidification treatment of dredged sediment in a pipeline according to claim 1, wherein the mixing device comprises a component selected from a serpentine tube, a multi-stage series W-shaped tube, a cylindrical vertical stirring, mixing and homogenizing device, a hydraulic self-rotating homogenizing and mixing device, a gas-phase mixing and homogenizing tube, a pneumatic mixing-assisted expansion tube, and a combination thereof.

4. The device for flow solidification treatment of dredged sediment in a pipeline according to claim 3, wherein the cylindrical vertical stirring, mixing and homogenizing device comprises a motor, a stirring barrel and a stirring blade that is arranged in the stirring barrel and is connected to an output shaft of the motor, and an admixture pump inlet of the plurality of admixture pump inlets is arranged on the stirring barrel.

5. The device for flow solidification treatment of dredged sediment in a pipeline according to claim 3, wherein the mixing device comprises the hydraulic self-rotating homogenizing and mixing device, the hydraulic self-rotating homogenizing and mixing device comprises a mixing pipe and a shaft arranged at the center of the mixing pipe, blades are rotationally arranged on the surface of the shaft, and an admixture pump inlet of the plurality of admixture pump inlets is arranged on the mixing pipe.

6. The device for flow solidification treatment of dredged sediment in a pipeline according to claim 3, wherein where the mixing device comprises the pneumatic mixing-assisted expansion tube, the pneumatic mixing-assisted expansion tube comprises a pre-conveying area, an expansion area and a post-conveying area that are arranged in sequence, an admixture pump inlet of the plurality of admixture pump inlets is arranged on the expansion area, the pre-conveying area and the post-conveying area are provided with air inlets, the admixture injection pump is communicated with the admixture pump inlet, and the air inlets are connected to the air pump.

* * * * *